2,952,669
POLYMERIZATION OF PERFLUOROCARBON POLYMERS

Manville Isager Bro, Wilmington, Del., assignor to E. I. du Pont de Nemours and Company, Wilmington, Del., a corporation of Delaware No Drawing. Filed Sept. 17, 1954, Ser. No. 456,883

18 Claims. (Cl. 260—87.5)

This invention relates to the polymerization of perfluorocarbon polymers and more particularly to the polymerization of tetrafluoroethylene and the copolymerization of tetrafluoroethylene with other perfluorinated olefins in fluorinated liquid media.

Polymers of tetrafluoroethylene and copolymers of tetrafluoroethylene with other perfluorinated olefins, e.g., hexafluoropropylene, hexafluorocyclobutene, octafluorocyclopentene, hexafluorobutadiene, etc., hereinafter referred to as perfluorocarbon polymers have been disclosed in U.S. Patent 2,230,654 for polymeric tetrafluoroethylene and in U.S. Patents 2,468,664, 2,479,367, 2,511,258, and 2,549,935, for copolymers of tetrafluoroethylene with the above said class of compounds. The use of fluorinated compounds, other than the above described monomers, in the polymerization of perfluorocarbon polymers in particular and halocarbon polymers in general as polymerization aids or polymer modifiers is known to those skilled in the art. Thus fluorinated compounds have been used as dispersing agents in the water phase polymerization of tetrafluoroethylene to obtain aqueous dispersions of polymeric tetrafluoroethylene as described in U.S. Patent 2,662,065. Fluorinated compounds have also been disclosed as plasticizing agents which can be added to halocarbon monomers prior to their polymerization or after polymerization to give plasticized polymer compositions, but serious difficulties have arisen when attempts were made to plasticize tetrafluoroethylene polymer in this manner. Fluorinated peroxygen compounds have been used to catalyze or initiate polymerizations of halogenated monomers as described in U.S. Patent 2,559,630.

The beneficial effects of using low boiling perfluorinated solvents, e.g., solvents boiling below 150° C. and consisting almost entirely of carbon and fluorine, as media for the polymerization of perfluorocarbon monomers are quite surprising. This process of polymerization does not lead to the formation of plasticized polymers and hence it differs from processes for making plasticized compositions by polymerizing halogenated polymers in the presence of halogenated liquids. Perfluorocarbon polymers differ from other halogenated polymers in that high molecular weight perfluorocarbon polymers are not plasticized by perfluorinated solvents under conditions used for the polymerization of perfluorocarbon monomers. It has also been found that tetrafluoroethylene will react with all organic solvents containing hydrogen, chlorine, bromine, unsaturated carbon double bonds under polymerization conditions resulting in low molecular weight polymers, e.g. waxes or brittle solids as indicated by U.S. Patent 2,562,547. The only compounds found that do not interfere in the polymerization of perfluorocarbon monomers are liquid compounds having no unsaturation and being completely substituted with fluorine. Thus, most halogenated compounds used in plasticization of perhalogen polymers other than perfluorocarbon polymers, cannot be used as media for the production of tough, solid perfluorocarbon polymers, since they will act as telomerizing agents, i.e., agents that will give low molecular weight polymers. A tough polymer is defined as a polymer that can be molded into a thin film, which can be bent 180° without breaking.

This invention has as an object a novel process for polymerizing perfluorocarbon polymers. A further object of this invention is to polymerize perfluorocarbon monomers to polymers at increased rates and yields. Yet another object of this invention is to provide a process for new polymeric compositions. A further object of this invention is to provide a process for polymerizing perfluorocarbon polymers that will prevent polymer formation on the surface of the equipment used for said polymerization. These and other objects will be apparent from the description of the invention given herein below.

The present invention accomplishes the foregoing objects by polymerizing tetrafluoroethylene with itself or with other ethylenically unsaturated perfluorinated compounds in the presence of an aliphatic volatile liquid compound, of the class consisting of saturated perfluorinated hydrocarbons, saturated perfluorinated ethers and saturated perfluorinated amines boiling below 150° C., and having therein dissolved a promoter or catalyst of the class of peroxygen or azo compounds to give solid, tough polymers, followed by the removal and recovery of said perfluorinated liquids from the resulting polymer perfluorinated solvent mixture.

It has now been discovered, that in the presence of perfluorinated liquid, aliphatic compounds such as perfluorocyclobutane, perfluoromethyl cyclohexane, perfluorokerosene, perfluorotributyl amine, etc., and a catalyst such as a peroxygen compound or an azo compound, high molecular weight perfluorocarbon polymers can be obtained under polymerization conditions used in other processes of obtaining perfluorocarbon polymers. Due to the greatly increased solubility of perfluorocarbon monomers, under polymer-forming conditions, such as tetrafluoroethylene, hexafluoropropylene, etc., as compared to their solubility in other polymerization media such as water, polymerization reactions may be carried out at faster rates and lower temperatures and yet result in better yields. Some copolymerizations of tetrafluoroethylene with other perfluorinated compounds, such as perfluorocyclobutene, which previous to this invention were obtained only with great difficulty and could not be polymerized beyond the stage of brittle solids, can now be polymerized with relative ease to tough solids using the process of this invention.

It is known that perfluorocarbon polymers such as polytetrafluoroethylene have very low coefficients of adhesion and are extremely inert. It is furthermore known that perfluorocarbons, such as the solvents used in practicing this invention, are very volatile and also in addition extremely inert. Thus in this process of polymerization no plasticization of the polymeric materials occurs and furthermore the perfluorinated liquids used as media for the polymerization may easily and completely be recovered by evaporation from the physical mixture formed by the polymer and its medium in the polymerization step of this invention.

The general class of halogenated solvents such as liquid polymers of chlorotrifluoroethylene, fluorinated alcohols, carbon tetrachloride, tetrachloroethylenes, and all partially halogenated hydrocarbons do not exhibit the inertness of the perfluorocarbon compounds used in this invention and will therefore react with growing chains of perfluorocarbon polymers and cause the formation of low molecular weight, so called "telomerized" polymers, undesirable from the standpoint of this invention.

It has also been discovered that the perfluorinated liquids, emulsified in water with the aid of a dispersing agent used as media in the polymerization of perfluorocarbon polymers will give rise to polymer formation within the perfluorinated liquid part of the emulsion without causing polymerization in the water phase of the emulsion. This was shown by the fact that on breaking the emulsion the water phase could be separated from the liquid perfluorinated compound with only traces of the polymer contained in the water and most of the polymer contained in the perfluorinated liquid phase. Thus the water acts merely as a heat transfer medium. The advantages gained by this phase of the invention refer to the physical nature of the resulting polymer and not to its inherent structure and will be described in greater detail hereinbelow.

The saturated perfluorinated liquids used as polymerization media in this novel process are physically adsorbed on the polymer in the polymerization phase to give a wet spongy solid, but are easily recovered by distillation at reduced pressure, leaving the solid polymer behind, which has in essence the same properties as a polymer of the same monomers made by other processes. For reasons of fast and complete removal of the saturated perfluorinated liquid medium from the perfluorocarbon polymer it is preferred to use the more volatile perfluorinated liquids such as perfluorocyclobutane, perfluoromethylcyclohexane, perfluorodimethylcyclohexane, and perfluorokerosenes. Some of these compounds may be prepared by pyrolysis of polytetrafluoroethylene or tetrafluoroethylene as described in U.S. Patent 2,384,821 or U.S. Patent 2,404,374 and in other ways known to those skilled in the art. In using these perfluorosolvents as media for polymerizing perfluorocarbon monomers great care has to be taken that said compounds are pure. Impurities in said solvents will result in the formation of telomerized polymers, not desired in the process of this invention. Impurities may be removed by repeated distillations, treatment with butylamine, or by other methods known to those skilled in the art. Upon recovery of the perfluorinated medium from the polymer medium mixture the medium may be reused without further treatment. As a matter of fact, trace impurities are "polymerized out," so that on each polymerization the perfluorinated liquid medium attains a higher degree of purity.

The catalysts and initiators that can be used in the process of this invention are in general peroxygen compounds well known to those skilled in the art and azo compounds such as described in U.S. Patent 2,559,630. Previous to this invention the most common medium for the polymerization of perfluorocarbon monomers has been water. This medium however has the disadvantage of limited solubility of organic initiators and catalysts as well as the possibility of chemical attack of the medium on the catalyst, under polymer forming conditions thus reducing or destroying its activity. Thus the use of inert organic solvents as used in the process of this invention will increase the effectiveness of organic catalysts. This is especially well illustrated by use of perfluorinated peroxygen compounds as initiators. These compounds are very reactive catalysts, but unstable in the presence of water above 0° C. The use of a perfluorinated saturated liquid as the polymerization medium makes the polymerization of tetrafluoroethylene at much lower temperatures and pressures possible. These conditions are below the critical pressures and temperatures of tetrafluoroethylene, so that polymerization may occur in a liquid monomer stage having therein dissolved the medium and the catalyst, a feat generally not accomplished in other processes of preparing tetrafluoroethylene polymer.

The amounts of catalyst or initiator and of the perfluorinated liquid medium to be used in the process of this invention may be varied over large range depending on the results that are desired. Preferred catalyst concentrations are from 0.001% to 1% of the perfluorinated liquid medium. The amount of perfluorinated liquid medium preferred may vary from a 1:1 monomer to medium ratio to a 1:50 monomer to medium ratio.

The following examples are presented to further illustrate the process of this invention and are not intended to limit the scope of this invention. All parts are in weight unless otherwise stated.

*Example 1.*—In a pressure resistant stainless steel vessel having a capacity of 330 milliliters were placed 130 grams of perfluoromethylcyclohexane having therein dissolved 0.011 gram of alpha,alpha'-azodiisobutyronitrile. The vessel was closed, cooled to −70° C. and evacuated. The vessel and contents were warmed to 75° C. and purified tetrafluoroethylene was added through a valve in the head of the vessel until the pressure in the vessel had built up to 300 to 350 lb./sq. inch. The vessel and contents were then agitated maintaining pressure and temperature. The pressure in the vessel was maintained by continued addition of purified tetrafluoroethylene. The reaction was continued for 90 minutes. The vessel was then cooled and excess monomer vented off. The polytetrafluoroethylene - perfluoromethylcyclohexane mixture was removed from the stainless steel vessel and placed in a glass container. On evacuation the glass container was heated on a steam bath until all of the solvent had been removed. The yield of the polymer was 75 grams. The polymer could be compression molded at 380° C. into tough films.

For comparable results using water as a polymerization medium in similar equipment at higher pressures, 400 to 500 lbs. per square inch and longer times, 16 hours, yields of the polymer were only 10 to 15 grams.

*Example 2.*—Example 1 was repeated with the exception of using 250 grams of perfluorocyclobutane instead of 130 grams of perfluoromethylcyclohexane. Similar to Example 1, 28 grams of tetrafluoroethylene polymer was obtained.

*Example 3.*—In a pressure resistant stainless steel vessel cooled to −70° C. having a capacity of 330 parts of water were placed 105 grams of perfluorokerosene and 0.064 gram of diheptafluorobutyryl peroxide. The vessel was closed and evacuated. The vessel was then warmed to 15° C. and tetrafluoroethylene was added until a pressure of 100 to 150 lb./sq. inch was obtained. The vessel was agitated maintaining temperature and pressure substantially constant. After 10 minutes of agitation the reaction was stopped. Excess monomer was vented off and the polymer-medium mixture removed from the vessel. The perfluorokerosene was recovered from the polymeric tetrafluoroethylene by distillation at reduced pressures. A yield of 45.5 grams of tetrafluoroethylene polymer was obtained. Compression molded, sintered samples were found to have a stiffness of 60,000 lb./sq. inch, a tensile strength of 2100 lb./sq. inch and an elongation of 200%.

*Example 4.*—Example 3 was repeated using 200 grams of perfluorocyclobutane (instead of 105 grams of perfluorokerosene) and 0.0127 gram of diheptafluorobutyryl peroxide instead of 0.064 gram. The reaction was maintained 180 minutes and upon recovery of the perfluorocyclobutane 125 grams of polytetrafluoroethylene was obtained.

*Example 5.*—In a pressure resistant stainless steel vessel having a capacity of 330 milliliters was placed an emulsion of 150 grams of deoxygenated water, 65 grams of perfluorodimethylcyclohexane and 0.5 gram of ammonium perfluorocaprylate as emulsifying agent. To this emulsion 0.54 gram of alpha,alpha'-azodiisobutyronitrile was added. The vessel was closed, cooled to −70° C. and evacuated. The vessel and its contents were then heated to 75° C. and tetrafluoroethylene was added until the pressure had built up to 360–400 lb./sq. inch at which level the pressure was maintained throughout the course of the reaction. The reaction vessel was agitated for a period of 50 minutes. The vessel was then cooled down, excess monomer vented off and the vessel opened. Polytetrafluoroethylene was found to be present admixed with the perfluorodimethylcyclohexane in the shape of small granules. The polymer was separated from the water by filtration and the perfluorodimethylcyclohexane was recovered by distillation at reduced pressures. A yield of 63.8 grams of polytetrafluoroethylene was obtained. Samples, compression molded and sintered at 380° C., were found to have a stiffness of 62,700 lb./sq. inch, a tensile strength of 2100 lb./sq. inch and an elongation of 190%.

*Example 6.*—In a pressure resistant stainless steel vessel having a capacity of 330 milliliters was placed 105 grams of perfluorodimethylcyclohexane having therein dissolved 0.25 gram of alpha,alpha'-azodiisobutyronitrile. The vessel was closed and cooled to −70° C. and evacuated. Through a valve in the head of the vessel 10 grams of hexafluoropropylene were added to the reaction mixture. The vessel and contents were then warmed to 75° C. and purified tetrafluoroethylene was added through the said valve until pressure in the vessel had built up to 375 lb./sq. inch. The vessel and contents were then agitated maintaining pressure and temperature. The reaction was stopped after 120 minutes. The vessel was cooled and excess monomer removed. The mixture of perfluorodimethylcyclohexane and a polymer was removed from the stainless steel vessel and placed in a glass container. On evacuation the glass container was heated on a steam bath until substantially all of the solvent had been removed. The yield of the solid, white copolymer was 32.4 grams. The melting point range of 314 to 319° C. indicated the formation of tetrafluoroethylene hexafluoropropylene copolymer. Tetrafluoroethylene polymer has a melting point range of 327 to 330° C. The copolymer was compression molded at 360° C. into tough films.

*Example 7.*—Example 6 was repeated using 100 grams of perfluoromethylcyclohexane and 0.2 gram of alpha, alpha'-azo-diisobutyronitrile. Upon evacuation and cooling 7.5 grams of hexafluorocyclobutene were added instead of the 10 grams of hexafluoropropylene.

The tetrafluoroethylene-hexafluorocyclobutene copolymer yield obtained was 69.6 grams. The off gases from the polymerization phase were analyzed and it was found that 5.2 grams of hexafluorocyclobutene had reacted with tetrafluoroethylene to give a copolymer. On compression molding at 360° C. tough films were obtained from the copolymer.

*Example 8.*—In a pressure resistant stainless steel vessel having a capacity of 330 milliliters was placed a solution of 0.054 gram of alpha,alpha'-azodiisobutyronitrile in 100 milliliters of perfluorotributylamine. The vessel was closed, cooled to −70° C. and evacuated. The vessel was heated to 75° C. and pressured to 400 p.s.i. with tetrafluoroethylene. The reaction vessel was then agitated for a period 90 min. The vessel was cooled and excess monomer removed. The mixture of perfluorotributylamine and polymer was removed from the stainless steel vessel and placed in a glass container. On evacuation the glass container was heated on a steam bath until all of the solvent had been removed. The yield of the polymer was 98 grams. The polymer could be compression molded at 380° C. into tough films.

Similar results are obtained when a cyclic perfluorinated ether having the formula $C_8F_{16}O$ boiling at 103° C. is used instead of the perfluorotributylamine.

The invention disclosed hereinabove is useful in the polymerization of perfluorocarbon polymers. The use of perfluorinated saturated liquids as media for the polymerization of said polymers increases the rate of reaction and gives higher yields of polymer as compared with other media. In this system lower pressures and temperatures and shorter reaction times become operable, as compared with prior art processes. A wider range of catalysts can be used through the process of this invention, since the media are inert organic compounds. Due to the increased solubility of the perfluorocarbon monomers in the media used in the process of this invention under polymerization conditions copolymers of tetrafluoroethylene obtained otherwise only with great difficulty are made readily available. Catalysts beneficial to the properties of perfluorocarbon polymers such as perfluoro oxygen compounds imparting increased heat stability, may be employed in the process of this invention. The use of saturated perfluorinated solvents emulsified with water as media for the polymerization of perfluorocarbon monomers avoids the formation of adhesion polymer. Adhesion polymer is polymer adhering to the interior surface of the polymerization equipment where it is formed in situ during the polymerization. This adhesion polymer makes continuous cleaning of equipment necessary and often is of inferior quality and therefore constitutes a waste. Furthermore perfluorocarbon polymers obtained by this latter phase of the process of this invention are in the form of spherical granules, maintained even after removal of the perfluorinated solvents. This shape improves the flow properties of the polymer powder, which is of great importance in further fabrication of perfluorocarbon polymers in the manufacture of articles therefrom.

I claim:

1. A process for polymerizing monoethylenically unsaturated perfluorocarbon monomer which comprises introducing said monomer in gaseous form into a perfluorinated, saturated, liquid solvent boiling below 150° C., of the class consisting of perfluorinated hydrocarbons, perfluorinated ethers and perfluorinated tertiary amines, having therein dissolved a polymerization catalyst, polymerizing said monomer in said solvent, removing a polymer-solvent slurry and separating said solvent and polymer.

2. A process as set forth in claim 1 wherein the monomer is tetrafluoroethylene.

3. A process as set forth in claim 1 wherein the monomer is a mixture of tetrafluoroethylene and hexafluoropropylene.

4. A process as set forth in claim 1 wherein the monomer is a mixture of tetrafluoroethylene and hexafluorocyclobutene.

5. A process for polymerizing monoethylenically unsaturated perfluorocarbon monomer, which comprises introducing said monomer in gaseous form into a liquid, saturated, completely fluorinated hydrocarbon solvent boiling below 150° C., having therein dissolved a polymerization catalyst, polymerizing said monomer in said solvent, removing a polymer-solvent slurry and separating said solvent and polymer.

6. A process for the polymerization of tetrafluoroethylene which comprises introducing gaseous tetrafluoroethylene into a liquid, saturated, completely fluorinated hydrocarbon solvent boiling below 150° C., having therein dissolved a polymerization catalyst, polymerizing said tetrafluoroethylene in said solvent, removing a polymer-solvent slurry and separating said solvent and polymer.

7. A process as set forth in claim 6 in which said catalyst is an azo compound.

8. A process as set forth in claim 6 in which said catalyst is a peroxygen compound.

9. A process as set forth in claim 6 in which said perfluorinated hydrocarbon is perfluorocyclobutane.

10. A process as set forth in claim 6 in which said perfluorinated hydrocarbon is perfluoromethylcyclohexane.

11. A process as set forth in claim 6 in which said perfluorinated hydrocarbon is perfluorodimethylcyclohexane.

12. A process as set forth in claim 6 in which said perfluorinated solvent is perfluorokerosene, containing 10 to 14 carbon atoms per molecule.

13. A process for polymerizing monoethylenically unsaturated perfluorocarbon monomer which comprises introducing said monomer in gaseous form into a liquid, saturated, completely fluorinated hydrocarbon solvent, boiling below 150° C., having therein dissolved from 0.001 to 5 weight percent based on the solvent, of a polymerization catalyst, polymerizing said monomer in said solvent at a pressure of 1 to 100 atmospheres and a temperature of 0° to 100° C., removing a polymer-solvent slurry and separating said solvent and polymer.

14. A process as set forth in claim 13 wherein the monomer is tetrafluoroethylene.

15. A process for the polymerization of monoethylenically unsaturated perfluorocarbon monomer, which comprises introducing said monomer in gaseous form into a liquid, saturated, completely fluorinated hydrocarbon solvent, boiling below 150° C., said solvent being employed in a ratio of solvent to monomer of 1:1 to 50:1, having therein dissolved from 0.001 to 1 weight percent, based on the solvent of a fluorinated peroxide, polymerizing said monomer in said solvent, removing a polymer-solvent slurry and separating said solvent and polymer.

16. A process as set forth in claim 15 wherein the polymerization is carried out at a temperature of 0° to 100° C., and at a pressure of 1 to 100 atmospheres.

17. A process as set forth in claim 15 wherein the monomer is tetrafluoroethylene.

18. A process as set forth in claim 15 wherein the monomer is a mixture of tetrafluoroethylene and hexafluoropropylene.

References Cited in the file of this patent

UNITED STATES PATENTS

| | | |
|---|---|---|
| 2,600,804 | Rearick | June 17, 1952 |
| 2,600,821 | Wrightson | June 17, 1952 |
| 2,662,065 | Berry | Dec. 8, 1953 |
| 2,700,661 | Miller | Jan. 25, 1955 |
| 2,700,662 | Young et al. | Jan. 25, 1955 |
| 2,705,706 | Dittman et al. | Apr. 5, 1955 |
| 2,748,098 | Passino | May 29, 1956 |